United States Patent Office 3,436,753
Patented Apr. 1, 1969

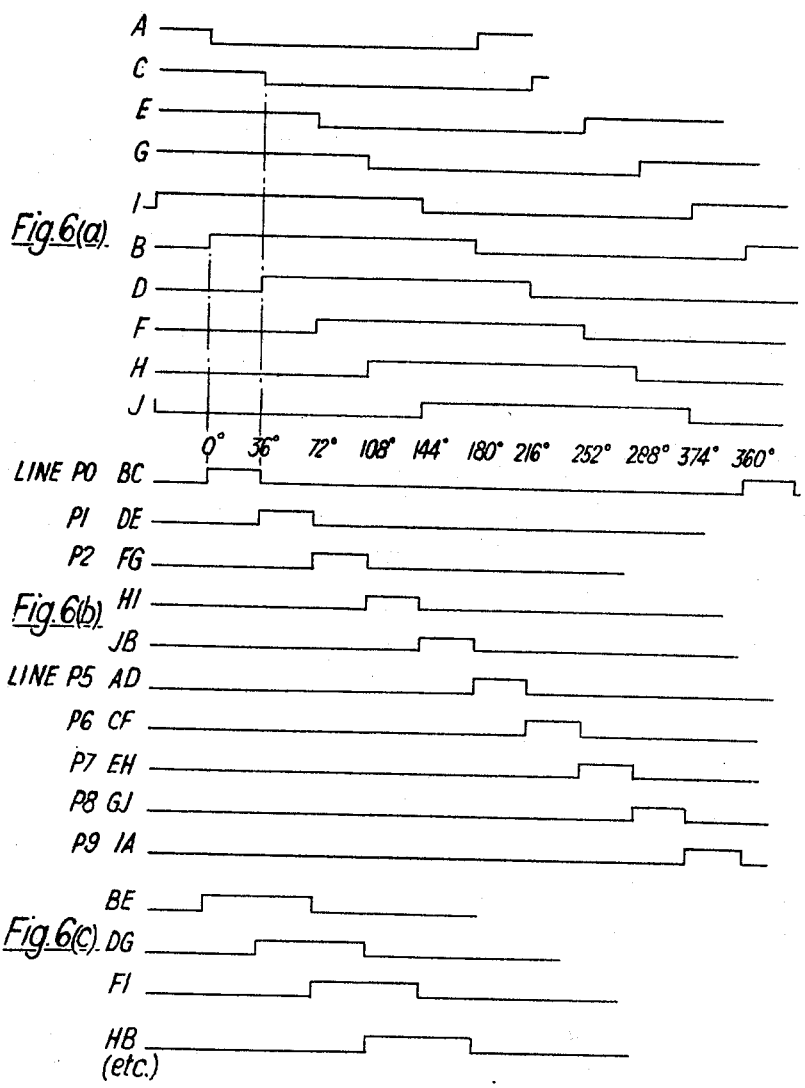

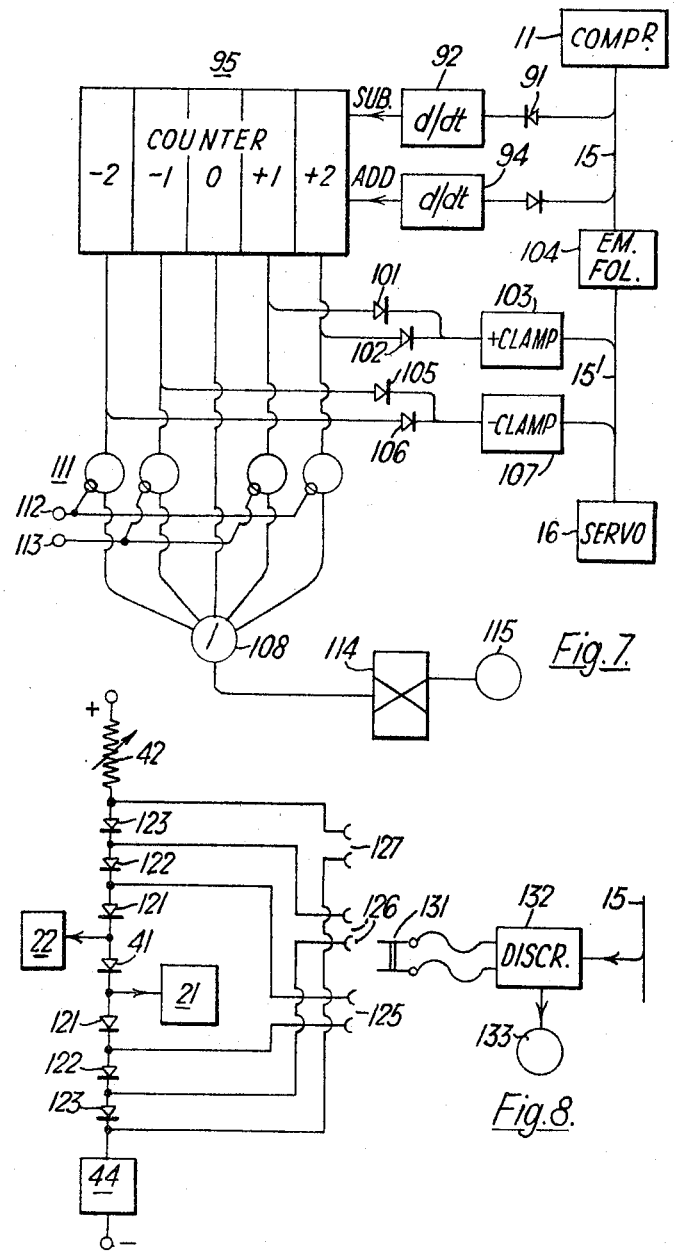

3,436,753
APPARATUS FOR COUNTING ELECTRICAL PULSES
George Sanderson Walker and Ronald Robert McLaren, Edinburgh, Scotland, assignors to Ferranti, Limited, Hollinwood, England, a company of Great Britain and Northern Ireland
Filed May 7, 1965, Ser. No. 453,945
Claims priority, application Great Britain, May 8, 1964, 19,255/64
Int. Cl. H04l 3/00; H03k 13/00; G08c 9/00
U.S. Cl. 340—347
12 Claims

ABSTRACT OF THE DISCLOSURE

Apparatus is provided for counting electrical pulses which are received over three or more input lines which the pulses energise singly, sequentially and cyclically. A follow-up servo is used to maintain the states of energisation of two sets of lines in step-by-step correspondence, and a bidirectional counter counts the pulses necessary to maintain the correspondence.

---

Figure 1:
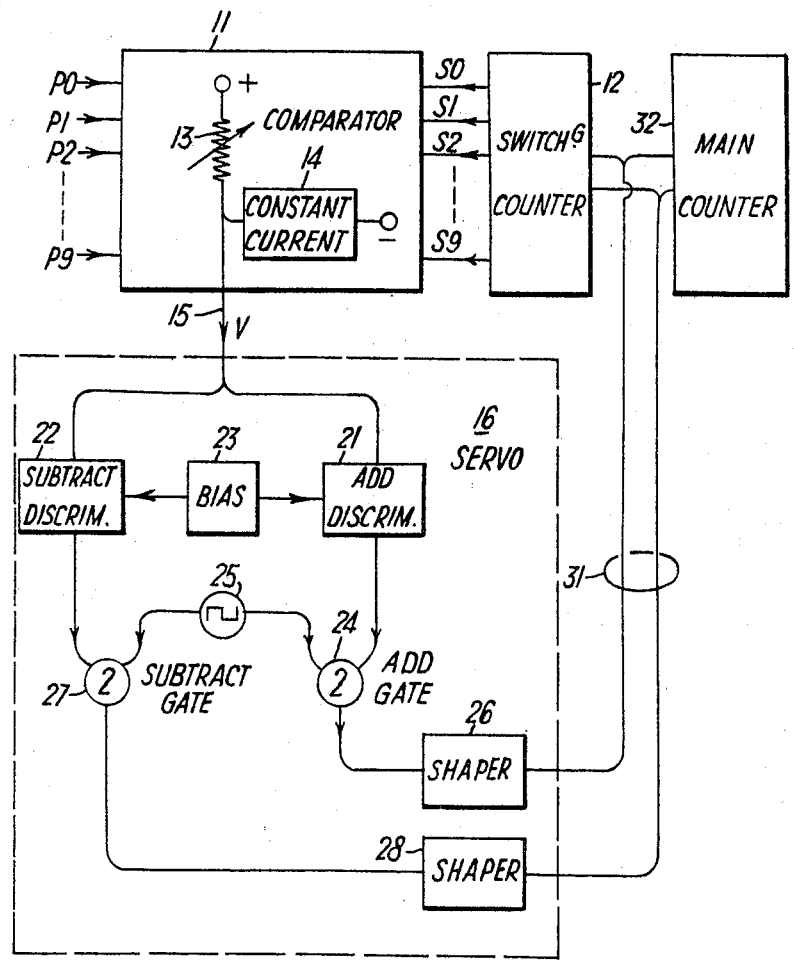

This invention relates to apparatus for counting electrical pulses, and specifically where the pulses are delivered by three or more lines which they energise sequentially and cyclically, in one or other cyclic direction, and have to be counted algebraically—that is, by adding the pulses received during one cyclic direction and subtracting from the count those derived during the other.

The invention has particular application where the pulses constitute a measurement of the extent and sense of the movement of a cyclic wave pattern in one or other of opposite directions with respect to a reference structure. The pattern may itself be moving in proportion to the movement of some object, such as a measuring probe or a part of a machine tool, so that by measuring the pattern movement that of the object may be determined. The sense of the movement is represented by the cyclic direction in which the pulses energise the lines; for example, where there are three lines A, B, and C, the pattern may cause them to be energised either in the cyclic direction A, B, C, A, B, C, and so on, or in the opposite direction A, C, B, A, C, B, and so on. The overall extent of the movement which occurs in any particular period under review is derived from the algebraic sum of the pulses delivered by the lines during that period. The invention will accordingly be described in this connection, but it should be understood that it has other applications where the pulses to be counted are delivered over three or more lines in the manner described.

Under certain unfavourable conditions of operation, mis-counting of the pulses may occur. For example, over a transient period the movement to be measured may be so rapid that the pulses representing it arrive too quickly for the counter to accept them, with the result that some of them are irrecoverably lost. Vibrational movements may have the same effect. Where a sudden reversal of the movement occurs, pulses may be lost because the counter is unable to change from its Add to its Subtract condition quickly enough. Pulses may also be lost because of a momentary circuit failure of the counter, such as a multivibrator being slow in response.

An object of the present invention is to provide apparatus for the purpose stated which in particular is less liable to miscount pulses under the unfavourable conditions referred to.

In accordance with the present invention, apparatus for algebraically counting the electrical pulses in a primary train delivered by N primary lines (where N is at least three) energised by the pulses sequentially and cyclically in one or other cyclic direction, according to whether the pulses are to be added or subtracted, includes N secondary lines associated with the N primary lines respectively, a bidirectional switching counter operating in the N scale for sequentially energising the secondary lines by a secondary train of pulses derived from a source of secondary pulses, a comparator arranged to receive the primary and secondary trains and including a variable resistor arranged to depart from a datum resistance value whenever the trains fall out of step with one another—that is to say, whenever the trains cease to energise associated lines at the same time—to a predetermined extent, the resistance increasing or decreasing from the datum value in dependence on which train has fallen behind, servo means for controlling the application of the secondary pulses from said source to the counter to be added or subtracted in such dependence on the value of said resistance as to tend to keep the trains in step, and a main bidirectional counter for algebraically counting the secondary pulses as supplied to the switching counter.

Figure 2:
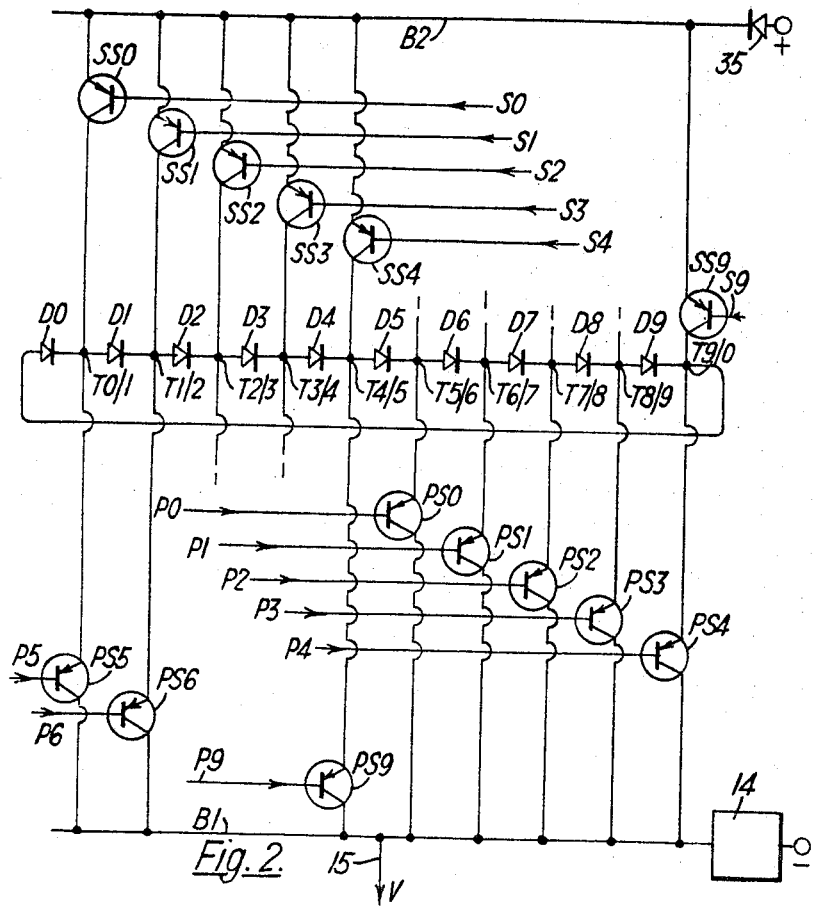
Figure 3:
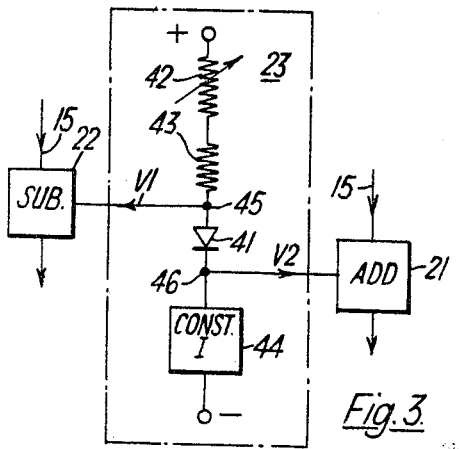
Figure 4:
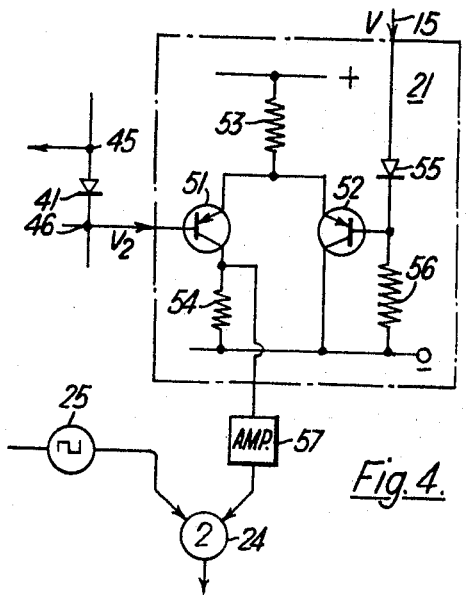
Figure 5:
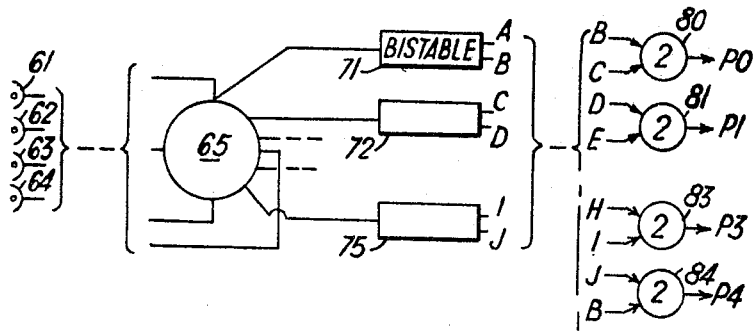

In the accompanying drawings:
FIGURE 1 is a simplified schematic diagram of one embodiment of the invention,
FIGURES 2, 3, and 4 show in detail parts shown generally in FIGURE 1,
FIGURE 5 is a schematic diagram of another part of the invention,
FIGURES 6a, 6b, 6c show waveforms to illustrate the operation of the apparatus of FIGURE 5, and
FIGURES 7 and 8 are schematic diagrams of parts of FIGURE 1 modified in accordance with two further embodiments.

An embodiment of the invention will now be described by way of example as used for algebraically counting electrical pulses in a primary train delivered by ten primary lines P0 to P9 energised by the pulses sequentially and cyclically to represent the respective ten decimal digits. The pulses are themselves derived in dependence on the movement of a worktable of a machine tool so that when the table moves in a forward direction the lines are energised by them in the cyclic order P1, P2, P3 . . . P9, P0, P1, and so on, whereas when the table moves in the reverse direction the lines are energised in the order P1, P0, P9, P8, . . . and so on.

The lines are connected as one of the two input channels to a comparator 11. The other input channel is formed by ten secondary lines S0 to S9 which are arranged to be pulse-energised by a secondary train of pulses, to represent the ten decimal digits, under the control of a single-stage bidirectional switching counter 12 operating in the decimal scale.

The comparator may be thought of for the moment as including a variable resistor 13 which is connected in series with a constant-current device 14 between sources of positive and negative potentials so that the common point of components 13 and 14, connected to the output line 15, varies in voltage with respect to the potential sources in proportion to the resistance of resistor 13. Thus a decrease in that resistance causes the potential difference across it to decrease and hence causes the voltage of line 15 to move in the positive direction—that is, to increase—whereas an increase in the resistance causes the voltage of line 15 to move in the negative direction—that is, to decrease. References hereinafter to the increase or decrease of that voltage should be understood accordingly.

Each of lines P is associated with the particular one of lines S which represents the same digit—line P0 with line S0, P1 with S1, and so on—and the comparator is so designed that when the two trains are in step with one another—by which is meant that the respective lines energised at the same time are associated lines, and hence that the digit value registered by the lines P is the same as that registered by the lines S—the resistance has a datum value, but so that when the trains fall out of step to a predetermined extent and so cease to energise associated lines at the same time, with the result that the digits represented by the respective lines are no longer the same, the resistance 13 decreases when the primary train falls behind, but increases when the secondary train falls behind, in each case as indicated by the fact that associated lines are not energised together. Hence the voltage of lead 15 increases or decreases, as the case may be.

Lead 15 is connected to servo means 16; here the voltage V on the lead is applied in parallel to a discriminator system in the form of an Add and a Subtract gate discriminator 21 and 22 arranged to compare that voltage with a reference voltage range defined by two threshold reference voltages from a bias stage 23. As the result of this comparison, the Add or the Subtract discriminator responds whenever the voltage V departs from that range by decreasing or increasing, as the case may be, to a predetermined extent beyond the value corresponding to the datum value of resistor 13.

The output from Add discriminator 21 is applied as one input to an Add gate 24 the other input to which is supplied by a source of secondary pulses in the form of a local pulse generator 25. The output from the gate is applied to an Add pulse shaper 26.

The output from Subtract discriminator 22 is similarly applied by way of a Subtract gate 27 (with generator 25) to a Subtract pulse shaper 28.

Pulse shapers 26 and 28 are arranged to standardise to a width and amplitude acceptable to the counter the pulses received from stage 25, when either gate 24 or 27 is open, into a train of local pulses in a combined Add/Subtract channel 31. These pulses are applied to switching-counter 12 and to a main bidirectional counter 32 which is provided with sufficient stages for the maximum reading required and which, like counter 12, operates in the decimal scale.

The servo circuits may include amplifier and buffer stages, but these are omitted from the drawing for clarity.

In counter 12, the lines S are connected to the respective digit stages so that the digit held by that counter is represented by the appropriate energisation of the secondary line denoted by that digit; for example when the counter holds digit 7, secondary line S7 is the one line so energised.

In describing the operation, it will be assumed to begin with that the worktable is stationary at a position represented by the energisation of primary line P4—that is, at a position represented in the cycle of energisation of the primary lines by digit 4—and that counter 12 holds that digit, so that line S4 is energised. As the energised lines are associated lines, resistor 13, and consequently the voltage V on line 15, have the datum values. Thus the servo system is in the condition in which no local pulses are applied to the counters.

Suppose now that the table begins to move in the forward direction. When it has done so to the extent of a digit interval, line P5 becomes energised instead of line P4. The two trains are thus out of step, with the secondary train falling behind. This causes resistor 13 to increase above the datum value and the voltage V to decrease stepwise sufficiently to pass outside the reference voltage range and actuate Add discriminator 21. The further result is to open Add gate 24 and so pass a pulse, after shaping at stage 26, into the Add side of counter 12. The pulse steps the counter forward to digit 5, thereby shifting the energisation to lead S5 and so restoring resistor 13 to its datum value. Thus as the table moves steadily forward, the servo means 16 so controls the application of the secondary pulses from generator 25 to counter 12, to be there added or subtracted in dependence on the resistance of resistor 13, as to slave the counter to follow the primary line energisation and so keep the two trains of pulses in step with one another. The counter is accordingly locked to the pattern.

Should the table move backwards, the cycle of energisation of the lines P becomes reversed so that the primary train of pulses falls behind the secondary train. This causes the voltage on lead 15 to increase, thereby passing outside the reference range in the other direction to actuate the Subtract discriminator 22 and so causing a local pulse to be fed in the Subtract sense to counter 12. Thus the cycle of energisation of the secondary lines becomes reversed too, and counter 12 again operates, but this time in the reverse direction, to tend to keep the two trains in step.

As the local pulses, as supplied to counter 12, are also applied to the main counter 32, the latter sums them algebraically so that the count which it holds at any moment represents the net movement of the table—that is, its total forward movement less its total backward movement—from its original position.

Counter 32 is provided in addition to counter 12 so that a tool movement in excess of that represented by the mere ten digits of counter 12 can be measured. A further advantage is that counter 32 can be reset to zero at any condition of the pattern whilst leaving counter 12 still locked to the pattern.

Details of some of the components described functionally above will now be briefly indicated.

Comparator 11 may take the form of a series ring of ten diodes D0 to D9, see FIG. 2, poled similarly round the ring with a tapping point or tap between each pair of adjacent diodes. The tap between diodes D0 and D1 is given the reference T0/1, that between diodes D1 to D2, T1/2, and so on. Each tap is connected to two buswires B1 and B2, common to the diode ring, by way of a primary and a secondary switching device PS and SS respectively. These devices, which are conveniently in the form of transistors, are arranged to be rendered conductive by the pulses delivered by the primary or the secondary lines, as the case may be; it is assumed that these pulses are negative going. Tap T0/1 is connected to buswire B1 by way of the collector/emitter path of a transistor PS5 the base of which is connected for control purposes to primary line P5; the tap is also connected to buswire B2 by way of a transistor SS0 the base of which is connected to secondary line S0.

Similar arrangements are made for the other taps. Thus tap T1/2 is connected to buswires B1 and B2 by way of transistors PS6 and SS1 controlled over the lines P6 and S1, and so on. This arrangement ensures that the transistors controlled over associated lines are connected to diametrically opposite points of the diode ring. For example, transistors PS3 and SS3, controlled over the two associated lines P3 and S3, are connected to taps T8/9 and T3/4 respectively. The reason for this spacing will become apparent later.

Buswire B2 is connected to the positive source by way of a diode 35 poled to conduct. Buswire B1 is connected to output lead 15 of the comparator and, by way of the constant-current device 14, to the negative source. Thus the place of resistor 13 of FIG. 1 is taken by the network between the buswires (ignoring the fixed resistance of diode 35 in its conductive condition).

In operation, when the two trains are in step, with the result that the two energised lines are associated lines, the buswires are connected by way of the corresponding two PS and SS transistors, rendered conductive by the pulses, and by way of five of diodes D conductively in series, this number of diodes being the same at each step. Thus when lines P3 and S3 are energised, transistors PS3 and SS3 are switched on, and the path between the buswires is by way of transistor SS3, diodes D4 to D8, and transistor PS3. The remaining diodes are facing the wrong way to conduct, and so do not provide a parallel path through the network. The overall resistance of that path—that is, of the five diodes and two transistors all in their conductive condition—has the datum value of the hypothetical single resistor 13.

If the secondary train is lagging by one pulse, so that transistor SS2 is energised with transistor PS3, the number of effective diodes D in the path between the buswires is increased by one (diode D3 being added). Hence the resistance of the path is increased above the data value, and in consequence the output voltage is reduced and the counters are stepped forward to bring the trains into step in the manner already described.

If the primary train should lag, the number of effective diodes becomes less than five, and in consequence the counters are stepped backwards.

In each case there are two conductive transistors in the path, the only variable being the number of diodes D that are in it.

The fact that associated lines control transistors to diametrically opposite taps allows the train to fall out of step to the extent of four or five pulses in either direction whilst still allowing the apparatus to catch up. If one train is expected never to lag as much as the other, the taps need not be diametrically opposite; but they should not coincide—for example, transistors PS4 and SS4 should not be connected to the same trap—unless one of the trains never falls behind.

Diode 35 is provided merely to drop the voltage on the emitter of each transistor a little to ensure cut-off in the absence of a control pulse on the base electrode.

Bias stage 23 may take the form shown in FIG. 3. A diode 41, of similar characteristics to diodes D, is connected in the conductive sense to a positive source by way of a variable resistor 42 and a fixed resistor 43, and to a negative point by way of a constant-current device 44. A tap 45 on the more positive side of the diode applies a reference voltage V1 to the Subtract gate discriminator 22, and a tap 46 on the other side applies a reference voltage V2 to the Add discriminator 21.

Voltages V1 and V2 are thus the two threshold voltages which define the reference range within which the output voltage V on lead 15 from the comparator may lie without causing any local pulses to be gated into the counters. These levels may be adjusted by the variable resistor 42 so as to lie equally on opposite sides of the datum voltage from the comparator. The fact that the two levels are separated by diode 41 of the same forward resistance as each of diodes D causes each of threshold voltages V1 and V2 to lie midway in the voltage step which would result from switching one of diodes D into or out of the path between the buswires.

Various forms of constant-current device may be used for stages 14 and 44. A convenient device is an n-p-n transistor with a fixed voltage on its base and a resistor between the emitter and the negative source, the constant-current path being that between the emitter and the collector.

A convenient arrangement for the Add gate discriminator 21 is shown in FIG. 4. It consists of two transistors 51 and 52 sharing the same emitter resistor 53 connected to the positive source of the stage. Transistor 51 has in addition a collector load resistor 54, whereas transistor 52 is arranged to operate as an emitter follower when not cut off. Lead 15 from the comparator is connected by way of a diode 55 to apply the voltage V to the base of transistor 52, this electrode being connected to the negative source of the stage by way of a resistor 56; the diode 55 is included to prevent back-coupling from the positive source of the stage to lead 15 by way of resistor 53 and the emitter/base path of transistor 52. The connection from tap 46 of the bias source (FIG. 3) applies the voltage V2 to the base of the other transistor 51. The output from the collector electrode of that transistor is applied by way of an amplifier 57 to gate 24.

In operation, the emitter-follower action of transistor 52 causes its emitter, and hence that of transistor 51, to have approximately the output voltage V from the comparator except when transistor 52 is cut off. So long as that voltage lies within the threshold range and hence is more positive than the voltage V2 on the base of transistor 51, the latter is conducting and no input is applied to gate 24. Whenever V is carried below V2 as the result of an out-of-step pulse of the two trains (the primary leading), transistor 51 becomes cut off for the duration of that pulse and so applies it in a negative-going sense to amplifier 57. As this is a single-stage amplifier its output pulse is of the reverse sense and so co-operates with the signal from pulse generator 25 to pass a pulse through gate 24 to step the counters forward.

Similar apparatus is provided for the Subtract discriminator 22. Here however the transistor corresponding to transistor 51 is cut off when the voltage V lies within the threshold and is rendered conductive when V becomes more positive than V1. As the output pulse is now positive-going, the output amplifier is provided with an even number of stages so as not to reverse it.

Convenient arrangements for energising the primary lines in response to the movement of a pattern are shown in FIG. 5.

The pattern (which is not shown) is watched by four photocells 61 to 64 spaced uniformly over one cycle of the pattern and hence at quadrature intervals. The outputs from the cells are applied to four equally-spaced feed points on a uniformly-wound resistance ring 65, or ring of carbon resistors, so that the taps from each pair of cells in counterphase with one another are diametrically opposite. From the ring five connections are made from taps where the voltages are 36° apart in phase to the trigger points of five bi-stable multivibrators 71 to 75. Further connections are taken from each of the two output points of each multivibrator. These connections are shown in the drawing as leads A and B for multivibrator 71, C and D for multivibrator 72, and so on. Leads B and C are connected as the inputs to a two-entry AND gate 80; leads D and E to a similar gate 81, and so on to gate 83. To gate 84 are connected leads J and B, and to the remaining gates (not shown) leads A and D, C and F, and so on. From the output of gates 80 to 89 are connected the primary lines P0 to P9 respectively.

The operation of this equipment will be briefly indicated with reference to FIG. 6, which shows at (a) the waveforms of the signals on the respective leads A to I from the multivibrators. Signals A, C, E, G, and I, being from like output points of the five multivibrators, are at 36° spacings; the remaining signals are in counterphase with them respectively.

At FIG. 6(b) are shown the waveforms of the signals passed by the gates (which are assumed to conduct when both inputs are in the more-positive condition) as the result of combining the signals of FIG. 6(a)—B with C, D with E, and so on, as indicated. The resulting signals form the primary train of pulses on lines P0 to P9.

Where these pulses are required to be of the reverse sense—for example, so as to operate the transistors of the comparator of FIG. 2—a reversing stage may be provided in each line or the multivibrators or gates may be suitably modified.

The effect of a slight gap between successive pulses P of the waveform of FIG. 6(b) would be a spike in the output voltage V on lead 15. If this should tend to occur, it may be prevented by deriving the P pulses so that successive ones overlap in time. This may be effected by modifying the signals applied to the gates so that signal B is combined with signal E, rather than with signal C, the other combinations being DG, FI, HB, and so on. The resulting P pulses are shown in FIG. 6(c). With the preferred form of transistorised counter used for stage 12, there is usually no danger of gaps between successive S pulses, for each digit stage when switched ON, reaches that condition slightly before the preceding digit stage is switched OFF, largely owing to the fact that most forms of transistor can be rendered conductive more quickly than they can be cut off.

If for any reason—say a transient movement of the worktable which is too fast for counter 12 to follow— the secondary pulse train should fall more than four pulses behind the primary train, the fifth pulse in arrear would reduce the number of effective diodes from nine to none and the resulting large drop in resistance would result in a correspondingly large positive-going step in the output voltage V on lead 15 from the comparator. If subsequently the worktable should slow down sufficiently, counter 12 would eventually catch up with it except for being ten pulses down—that is, too few— and would remain to that extent in error for the rest of the operation. Where the voltage V is so derived as to be free from spikes, as just described, arrangements may be made as shown in FIG. 7 to monitor for any such excess steps and prevent such a slipped-cycle form of error sufficiently to allow an extended range of operation within which the trains may fall out of step without causing a permanent error. The arrangements include an alarm system to indicate when all or a selectable part of the extended range has been exceeded.

To effect this, in brief, there is derived from each such excess step a signal which represents the particular end of the range that has been exceeded, and the signal is caused to act (by means of a voltage clamping stage) so as to apply to the servo system, in place of the variable voltage, a fixed voltage having the value reached by the variable voltage at that end of the range, just before it was exceeded; the variable voltage is restored to the servo as soon as the trains have returned to the unextended range.

For ease of reference, the end of the unextended range which is reached through the falling behind of the primary train will be referred to as the positive end of the range, because the variable voltage is there at its maximum in the positive direction. Similarly the other end of the range, reached through the falling behind of the secondary train, will be referred to as the negative end.

To monitor the voltage V for the positive-going excess steps at the negative end of the range, a connection is made from lead 15 by way of a diode 91, poled to pass positive-going steps, to a differentiating stage 92 biased to respond only to steps of that larger order and designed to derive a pulse from each. Monitoring for the excess steps at the positive end is similarly effected by a connection from lead 15 by way of a diode 93, poled to respond to negative-going steps, and a differentiating stage 94. One of stages 92 and 94 includes a phase-reversal network or amplifier so that the pulses derived by both those stages should have the same sense despite having been derived from voltage steps going in opposite directions. The pulses so derived by stages 92 and 94, thus representing respectively the negative and positive ends of the unextended range, are respectively applied to the Subtract and to the Add input points of a bidirectional five-stage binary counter 95. The centre stage is regarded as zero-indicating, the stages on one side of it as indicating the digits +1 and +2, and the other stages as indicating −1 and −2. Each stage has one output lead, energised positively or negatively according to whether the stage is ON or OFF—that is, according to whether or not the counter holds the digit represented. The counter is manually resettable to its zero condition, with only stage 0 ON.

The outputs from stages +1 and +2 of the counter are connected by way of diodes 101 and 102 to the control input of a clamp stage 103, the output from which is connected to a lead 15$^1$, to which lead 15 from the comparator 11 is connected by way of an emitter-follower stage 104. The outputs from stages −1 and −2 are similarly connected by way of diodes 105 and 106 to the control input of another clamp stage 107, the output from which is also applied to lead 15$^1$. Each of the four diodes is poled to conduct when the counter stage concerned is actuated, that is, ON. Lead 15$^1$ is connected as input to the servo means 16 (see FIG. 1) in place of lead 15.

The output from counter stage 0 is applied as one of the inputs to a five-entry Or gate 108. The outputs from the other four stages are connected to the other four inputs to the gate by Inhibit gates 111. The Inhibit control of the gates for stages +2 and −2 is applied by way of a terminal 112, and that for the other two gates by way of a terminal 113. The output from Or gate 108 is applied as input to a bistable stage 114 so as to maintain it in what may be called its OFF or ON stable condition according to whether the input is positive or negative. One of the outputs from the stage is applied to an alarm 115 of some kind, to actuate it when the stage is ON.

The operation of this equipment may be briefly indicated. So long as the two pulse trains P and S are sufficiently in step, the apparatus operates as already described with reference to FIG. 1. Of the additional equipment of FIG. 7, counter 95 is assumed to have been reset to zero, its 0 stage, being in its ON condition, applying a positive signal through gate 108 to hold stage 114 OFF with the alarm unactuated. The other four digit stages are OFF, with their outputs negative. The output voltage on lead 15 operates by way of amplifier 104 and lead 15$^1$ to control servo 16 as before, clamps 103 and 107 not being in operation. It is also assumed that terminals 112 and 113 are unenergised so that signals are free to pass through gates 111.

Suppose now that the secondary train falls sufficiently behind for the negative end of the unextended range to be passed, the effective diodes in the chain dropping from nine to none and the voltage V developing a large positive-going step in accordance. This passes through diode 91 to be turned into a pulse by differentiator 92 and applied in the subtract sense to the counter. Here the zero stage is switched off (its output going negative) and the −1 stage actuated by being switched ON (with its output now positive), thereby acting through diode 105 to apply the negative clamp 107 to lead 15$^1$. This clamp has the effect of applying to the servo (over lead 15$^1$) in place of the voltage V, which still continues to vary, a fixed voltage having the maximum value in the negative direction reached by the voltage V just before the step took place and hence appropriate to the signal pulse from stage 92 which stepped the counter 95. This allows the servo to continue to function and feed pulses to the counters 12 and 32 in the attempt to catch up with the worktable. The alarm 115 remains unoperated, the positive signal for holding stage 114 in its OFF condition being now supplied by stage −1 instead of stage 0.

If whilst these conditions obtain, the counter should in fact begin to catch up, the effective diodes would at length rise from none to nine, thereby originating a large voltage step, this time in the negative sense. Thus a pulse would be developed by differentiator 94, and applied to the Add input to the counter, where it would switch off the −1 stage and restore the zero stage. Clamp 107 would thereby be removed, and the apparatus revert to its original condition with neither clamp in operation and the variable voltage V restored to the servo.

If on the other hand the counter should still continue to fall behind, the tenth further pulse in arrear would repeat the positive-going voltage step. This would step counter 95 from stage −1 to stage −2, maintaining the negative clamp, this time by way of diode 106. The alarm would be still held off, by stage −2 now.

Should the counter fall outside even this extended range, the third voltage step would switch off stage −2 and leave no stage in the ON condition. Thus all five inputs to gtae 108 would be negative, stage 114 switched to ON, and the alarm given by stage 115. The condition would then require correction by the attendant and stage 95 reset by him to zero.

The operation is similar where it is the primary pulses that fall behind. This time, however, the voltage step is in the negative sense, the counter is stepped positively, and the positive clamp applied by stage 103. The alarm is held off as before until the additional range is exceeded.

By appling an inhibiting signal to terminal 112, the alarm is given when the reduced range represented by the +1 and −1 stages of the counter has been exceeded. By applying it to terminal 113 as well, the alarm is given at the first excess voltage step, the apparatus as a whole operating as if no range extension were provided. Only by energising neither terminal, as first described, is the full extended range brought into use.

This extension of range is useful not so much for the continuous operation of a machine tool—for in general the servo system is well able to keep the error within the unextended portion of the range—as in applications where the drive is stopped to enable the servo motor to perform some other function. If during this interval an error should build up owing to the drifting of the worktable—caused for instance by deflections due to the machining forces or by inaccuracies in the clamps—this error would not immediately be corrected because the motor would not be in circuit, and it might increase beyond the normal unextended range and so result in a slipped-cycle fault. Thus what the range extension provides is an increased range of memory, enabling the apparatus to be restarted without fault when the servo motor had been brought back into the circuit.

Where certain operations are to be performed on a workpiece, such as drilling a hole in a precise position on it, the tool may be required to drive the worktable for a particular distance, defined by the primary pulses, and then halted. Before the operation is performed, it is usually necessary to clamp the table. Where the application of the clamps is likely to disturb the table position thus reached, it is usually desirable to know the extent of the deviation, either to allow the position to be corrected in advance of the operation or, if it is not corrected, to allow the quality of the finished workpiece to be graded in accordance with the inaccuracy of location. To enable this to be done, the apparatus of FIG. 3 may be modified as shown in FIG. 8, in which the components already described are given their previous references.

Diode 41 is now the central diode of a series chain of seven of them, poled in the same sense and all, like diode 41, of the same forward resistance as that of the diodes in the diode ring. The pairs of diodes embracing diode 41 are given the references 121, 122, and 123, reading outwardly. Taps 45 and 46, immediately on each side of diode 41, are connected to discriminators 22 and 21 as before. The common points of diode pairs 121 and 122, and of pairs 122 and 123, are connected to socket pairs 125 and 126 respectively, whilst the outside points of the chain are connected to socket pair 127. A pair of plugs 131, designed to engage any of the three socket pairs, is connected by flexible leads as one of the inputs to a discriminator 132 to which a tap from lead 15 is connected as the other input. The output from the discriminator is connected to some indicating device 133.

During the normal operation of the apparatus, whilst the table is being driven in response to the primary pulses, the plugs 131 are not inserted in any of the socket pairs. The discriminator is thus inoperative and the apparatus as a whole operates as first described with reference to FIGS. 1 to 4. The reference voltage range is again derived from a single diode—diode 41—and the effect of the other six diodes is merely that of an extra resistor in the circuit, replacing, say, resistor 43 of FIG. 3.

With the table in its desired position and the clamps applied to it, the primary train of pulses has ceased. Nevertheless, the primary and secondary lines reached by the last pulses are still energised and in consequence the output voltage V from the comparator is still present on lead 15. If the clamps have not disturbed the position, the voltage V would have the datum value. If they have disturbed it, the voltage would differ from the datum to the extent of the potential difference across one or more of the diodes in the ring (and hence of the similar diodes in the chain 121–123) in dependence on the extent of the disturbance. To test for this, therefore, after the clamps have been applied, plugs 131 are first inserted in sockets 125. The discriminator is designed so that if the voltage on lead 15 lies between the voltages applied to the discriminator from sockets 125, no output sufficient to energise the indicator 133 is derived. The absence of this indication therefore shows that the voltage V lies within the range defined by diode pair 121 and hence within a diode voltage step above and below the datum value. This would normally be considered a sufficiently accurate position of the worktable.

Should indicator 133 react, thereby showing that the voltage V lies outside the range defined by diodes 121, the plugs 131 are transferred to sockets 126, to see whether it lies within the wider range defined by diodes 122. The absence of a response from indicator 133 would show that the voltage V lay between one and two diode steps of the datum value. The corresponding error in the position of the worktable would normally be considered too great for a product of the highest quality. Accordingly the position would either be corrected before the machining operation or the operation would be carried out and the product regarded as only of second quality. If on the other hand the indicator responded, showing that the voltage lay outside the range defined by diodes 122, the test is continued by transferring the plug to sockets 127.

It will be appreciated, in particular from the description of the embodiment of FIG. 8, that the references throughout this specification to "pulses" and to the "pulse" energisation of the primary and secondary lines should be understood in a broad sense. In the normal operation of the apparatus the lines are energised in sequence in dependence on the pattern movement, with the result that the "width" of each such pulse in any one line is the length of time for which it is energised. This in turn is inversely proportional to the speed of the movement. Thus whenever the pattern is stationary, as when the desired position of the worktable has been reached in the embodiment last described, and accordingly the particular primary and secondary lines which represent its then position are energised steadily, the "pulse" in each has a width equal to the duration of the stoppage. The term "pulse" should therefore be interpreted to include that condition of energisation.

Counting apparatus in accordance with the invention is therefore able to operate satisfactorily without loss of pulses, despite sudden reversals of movement or rapid transient movements within the range or ranges described.

What we claim is:

1. Apparatus for algebraically counting the electrical pulses in a primary train delivered by N primary lines (where N is at least three) energised by the pulses singly, sequentially and cyclically in one or other cyclic directions, according to whether the pulses are to be added or subtracted, including N secondary lines, a source of secondary pulses, a bidirectional switching counter operating in the N scale for sequentially energising the secondary lines by a secondary train of pulses derived from said source, a comparator, to which the primary and secondary lines are connected, and which includes a variable resistance arranged to depart from a datum value whenever the trains fall out of step with one another to a predetermined extent, the resistance increasing or decreasing from the datum value in dependence on which train has fallen behind, servo means arranged to be responsive to the value of said resistance and to control the application of the secondary pulses from said source to the counter to be added or subtracted in such dependence on the value of said resistance as to tend to keep the trains in step, and a main bidirectional counter for algebraically counting the secondary pulses as supplied to the switching counter.

2. Apparatus as claimed in claim 1 wherein the comparator includes means for deriving a variable voltage dependent in value on the value of said variable resistance and the servo means includes a discriminator system for comparing that voltage with a reference voltage range derived from a bias source and, whenever the variable voltage departs from that range, causing the secondary pulses to be applied to the counter to be added or subtracted according to the direction of that departure.

3. Apparatus as claimed in claim 2 wherein for extending the range within which the trains may fall out of step with one another there are provided for at least one end of the unextended range means for monitoring said variable voltage and deriving a signal each time that voltage changes in value as the result of a departure from that end of the range, voltage clamping means for actuation by that signal to apply to the servo means in place of the variable voltage a fixed voltage having the value reached by the variable voltage at that end of the range, and restoration means for restoring the variable voltage to the servo means when the trains are again within the unextended range.

4. Apparatus as claimed in claim 3 wherein said voltage clamping means and said restoration means together include a multistage bidirectional binary counter arranged to be stepped by each of said signals in one or other direction from a central stage according to which end of the unextended range is represented by that signal, the arrangement being such that each stage, other than the central stage, when so actuated by a signal causes the application to the servo means of a said fixed voltage of value appropriate to that signal.

5. Apparatus as claimed in claim 4 including an alarm system arranged to be actuated when the binary counter has been stepped to a stage at a selectable distance from the central stage.

6. Apparatus for algebraically counting the electrical pulses in a primary train delivered by N primary lines (where N is at least three) energised by the pulses sequentially and cyclically in one or other cyclic direction, according to whether the pulses are to be added or subtracted, including N secondary lines, a source of secondary pulses, a bidirectional switching counter operating in the N scale for sequentially energising the secondary lines by a secondary train of pulses derived from said source, a comparator, to which the primary and secondary lines are connected, and which includes a variable resistance arranged to depart from a datum value whenever the trains fall out of step with one another to a predetermined extent, the resistance increasing or decreasing from the datum value in dependence on which train has fallen behind, said variable resistance being that of the network between two buswires, said network comprising a series ring of N diodes poled similarly round the ring with a tapping point between each pair of adjacent diodes, for each tapping point a primary and a secondary switching device connected between that device and the two buswires, said buswires being common to the ring, the switching devices being connected to the primary or the secondary lines, as the case may be, to be rendered conductive by the pulses delivered by them, in such sequence round the ring that when the two trains are in step, the numbers of the diodes in the ring that are conductively in series between the buswires is the same at each step, servo means arranged to be responsive to the value of said resistance and to control the application of the secondary pulses from said source to the counter to be added or subtracted in such dependence on the value of said resistance as to tend to keep the trains in step, and a main bidirectional counter for algebraically counting the secondary pulses as supplied to the switching counter.

7. Apparatus as claimed in claim 6 wherein the comparator includes means for deriving a variable voltage dependent in value on the value of said variable resistance and the servo means includes a discriminator system for comparing that voltage with a reference voltage range derived from a bias source and, whenever the variable voltage departs from that range, causing the secondary pulses to be applied to the counter to be added or subtracted according to the direction of that departure.

8. Apparatus as claimed in claim 7 wherein the bias source includes a constant-current device in series with a diode between sources of potential, the diode having the same forward resistance as that of each diode in said ring, and the reference voltage range being defined by two threshold voltages derived from taps on the respetcive connections to the diode.

9. Apparatus as claimed in claim 8 wherein for extending the range within which the trains may fall out of step with one another there are provided for at least one end of the unextended range means for monitoring said variable voltage and deriving a signal each time that voltage changes in value as the result of a departure from that end of the range, voltage clamping means for actuation by that signal to apply to the servo means in place of the variable voltage a fixed voltage having the value reached by the variable voltage at the end of the range, and restoration means for restoring the variable voltage to the servo means when the trains are again within the unextended range.

10. Apparatus as claimed in claim 9 wherein said voltage clamping means and said restoration means together includes a multistage bidirectional binary counter arranged to be stepped by each of said signals in one or other direction from a central stage according to which end of the unextended range is represented by that signal, the arrangement being such that each stage, other than the central stage, when so actuated by a signal causes the application to the servo means of a said fixed voltage of value appropriate to that signal.

11. Apparatus as claimed in claim 10 including an alarm system arranged to be actuated when the binary counter has been stepped to a stage at a selectable distance from the central stage.

12. Apparatus as claimed in claim 8 where the primary train of pulses represents the movement of a machine tool, wherein for indicating departures of the tool from the position reached at the last primary pulse, said diode is included in a series chain of like diodes, all poled in the same direction, and there is provided a discriminator to one input of which is applied said variable voltage, the other input being arranged for connection to selectable pairs of taps on the chain, the discriminator being arranged to indicate whether or not the variable voltage lies between the voltages of any pair of taps so selected.

References Cited

UNITED STATES PATENTS

| 3,089,121 | 5/1963 | Rhodes | 235—177 |
| 3,098,995 | 7/1963 | Mundt | 340—146.2 |

MAYNARD R. WILBUR, *Primary Examiner.*

J. GLASSMAN, *Assistant Examiner.*

U.S. Cl. X.R.

235—92; 340—267